United States Patent [19]

Grewal

[11] Patent Number: 5,774,482
[45] Date of Patent: Jun. 30, 1998

[54] APPARATUS AND METHOD FOR PROCESSING ERRORS ASSOCIATED WITH DATA TRANSFERS IN A COMPUTER

[75] Inventor: Harsimran S. Grewal, San Francisco, Calif.

[73] Assignee: Sun Microsystems, Inc., Mountain View, Calif.

[21] Appl. No.: 643,114

[22] Filed: Apr. 30, 1996

[51] Int. Cl.[6] .................................................. G11C 29/00
[52] U.S. Cl. ..................... 371/40.2; 371/21.2; 371/37.2; 371/39.1; 371/40.1
[58] Field of Search ........................... 371/40.1, 48, 37.2, 371/37.7, 39.1, 6, 5.4, 32, 21.2, 37.4; 395/182.04, 250; 380/25

[56] References Cited

U.S. PATENT DOCUMENTS

| | | | |
|---|---|---|---|
| 4,276,647 | 6/1981 | Thacker et al. | 371/39.1 |
| 4,953,164 | 8/1990 | Asakura et al. | 371/40.1 |
| 5,182,752 | 1/1993 | DeRoo et al. | 371/37.7 |
| 5,404,361 | 4/1995 | Casorso et al. | 371/40.1 |
| 5,445,939 | 10/1995 | Rankin et al. | 395/182.04 |
| 5,450,422 | 9/1995 | Dell | 371/40.1 |
| 5,473,691 | 12/1995 | Menezes et al. | 380/25 |
| 5,590,287 | 12/1996 | Zeller et al. | 395/250 |

*Primary Examiner*—Paul P. Gordon
*Assistant Examiner*—McDieunel Marc
*Attorney, Agent, or Firm*—William S. Galliani; Flehr Hohbach Test Albritton & Herbert LLP

[57] ABSTRACT

An apparatus and method for transferring data within a computer includes a first computer sub-system connected to a second computer sub-system. The first computer sub-system produces data that is passed to the second computer sub-system. The second computer sub-system includes error detection circuitry to identify an original error in the passed data. The original error is identified with a first error identification technique, such as an error correction code technique. The second computer sub-system also includes error perpetuation circuitry to perpetuate an error in the data as it is passed to another computer sub-system. The error perpetuation circuitry perpetuates the error according to a second error identification technique, such as a parity bit error technique. The original data error is thereby perpetuated by converting it to the error identification format used by the computer sub-system to which the data is transferred. Consequently, the original data error is readily identified when an attempt is made to use the data. By perpetuating the data error instead of processing it when it arises, error handling delays can be avoided if the faulty data is never used.

20 Claims, 2 Drawing Sheets

APPARATUS AND METHOD FOR PROCESSING ERRORS ASSOCIATED WITH DATA TRANSFERS IN A COMPUTER

BRIEF DESCRIPTION OF THE INVENTION

This invention relates generally to the transfer of data between sub-systems of a computer. More particularly, this invention relates to the handling of errors associated with the transfer of data between sub-systems of a computer.

BACKGROUND OF THE INVENTION

Computers can be viewed as including a number of computer sub-systems that exchange data. Examples of computer sub-systems that exchange data include: (1) the central processing unit (CPU) of a computer; (2) the cache memory of the computer (either internal to the CPU (L1 cache) or external to the CPU (L2 cache)); (3) data buffers within the computer; (4) the primary memory of the computer, including random access memory; and (5) the secondary memory, including disc memory.

Occasionally, data errors arise when data is transferred from one computer sub-system to another. When a data error arises, it is typically handled by causing an interrupt of the CPU, capturing the address associated with the data error, and taking actions to prevent the use of the faulty data. This instantaneous error handling procedure is time consuming.

The problem of instantaneous error handling in a computer is more fully appreciated with reference to FIG. 1. FIG. 1 illustrates a computer 20. The computer 20 includes a CPU 22, which includes data generation circuitry 24, error detection circuitry 26, and error handling circuitry 28. The data generation circuitry 24 broadly refers to any circuitry that produces CPU output signals.

The error detection circuitry 26 is circuitry used to identify an error in data received at the CPU 22. The error detection circuitry 26 may be implemented using any one of several well-known error identification techniques. One known error identification technique is the parity error technique. In the parity error technique, the number of digital ONEs in a word (byte) is counted. The word has odd parity if the number of digital ONEs is odd, otherwise the word has even parity. When a word is written into a computer sub-system, the parity bit is also written (digital ONE for odd, digital ZERO for even). Then, when the word is read out, the parity bit is read and checked. If the parity of the memory word and the stored parity bit do not match, an error has occurred.

The problem with a parity bit error technique is that it cannot be used to tell which bit in a data word is in error. Thus, a second error identification technique known as an error correction code is sometimes used in error detection circuitry. An error correction code will detect and correct an error. Many computers use an error correction code that allows the detection of several bits of error and the correction of a single bit of error. Error correction codes work by using additional bits to encode the data. For example, eight additional bits may be used for every 128 bits of data.

The CPU 22 also includes error handling circuitry 28. The error handling circuitry 28 responds to a data error interrupt by capturing the address associated with the data error. In addition, the error handling circuitry 28 performs operations to insure that the corrupted data is not used.

FIG. 1 illustrates that the CPU 22 is connected to a cache 32. As known in the art, a cache 32 is a relatively small memory structure used to store data that is frequently used by the CPU 22. The cache 32 includes error detection circuitry 34. The error detection circuitry 34 is used to identify any data errors associated with data received from the CPU 22. The error detection circuitry 34 uses a predetermined error identification technique, such as a parity bit error technique or an error correction code technique. If an error is identified in the received data, then the error handling circuitry 36 is invoked. The error handling circuitry 36 causes an interrupt to be applied to the CPU 22. The interrupt is thereafter processed by the error handling circuitry 28 of the CPU 22. As previously indicated, the CPU 22 stops its processing to handle the interrupt. The interrupt is handled by capturing the address associated with the faulted data and by taking actions to insure that the faulted data is not used. As indicated above, these operations are relatively time consuming.

Another component associated with the cache 32 shown in FIG. 1 is the data generation circuitry 38. The data generation circuitry 38 broadly refers to any cache circuitry used to pass output data from the cache 32 to the primary memory 50. The cache 32 also includes error detection circuitry 40 for detecting errors in data received from the primary memory 50. In the event of an error, the error handling circuitry 36 is used, as previously described, to cause an interrupt of the CPU 22. Finally, the cache 32 includes data generation circuitry 42 that is used to pass output data to the CPU 22.

The primary memory 50 is a memory structure that stores data associated with a running process. Thus, it stores data that is expected to be used by the CPU 22. The primary memory 50 includes error detection circuitry 52, operating in the same manner as the error detection circuitry 34 of cache 32. The primary memory 50 also includes error handling circuitry 54, operating in the same manner as the error handling circuitry 36 of cache 32. The primary memory 50 also includes data generation circuitry 56, which broadly refers to any circuitry used to pass primary memory output signals to the secondary memory 70. As in the case of the cache 32, the primary memory 50 has a reverse data path. The reverse data path includes error detection circuitry 58 to identify errors in data received from the secondary memory 70. In the case of such an error, the error handling circuitry 54 generates a CPU interrupt, as previously described. The primary memory 50 also includes data generation circuitry 59 to pass data to the cache 32.

FIG. 1 also illustrates that a secondary memory 70 is connected to the primary memory 50. As known in the art, the secondary memory 70 is a large memory structure typically implemented as disc memory. The secondary memory 70 includes error detection circuitry 72, operating in the same manner as the previously described error detection circuitry. The secondary memory 70 also includes error handling circuitry 74, operating in the same manner as the previously described error handling circuitry. Finally, the secondary memory 70 includes data generation circuitry 76, which broadly refers to any circuitry used to generate secondary memory output signals for application to the primary memory 50.

Thus, it can be appreciated with reference to FIG. 1 that the different computer sub-systems (e.g., CPU 22, cache 32, primary memory 50, and secondary memory 70) each include error handling circuitry. The error handling circuitry adds to the system complexity. In addition, the error handling circuitry requires the instantaneous handling of data errors by the CPU 22.

It would be highly desirable to reduce the complexity of a computer by eliminating instantaneous data error handling circuitry in computer sub-systems. In addition, it would be highly desirable to eliminate the need for a CPU to instantaneously handle data errors as they arise. Since some data errors are associated with data that will not be used again, cycling time can be reduced if data errors are only handled when the faulty data is invoked for use.

SUMMARY OF THE INVENTION

The invention is an apparatus and method for transferring data within a computer. The apparatus includes a first computer sub-system connected to a second computer sub-system. The second computer sub-system includes error detection circuitry to identify an original error in the data received from the first computer sub-system. The original error is identified with a first error identification technique, such as an error correction code technique. The second computer sub-system also includes error perpetuation circuitry to perpetuate an error in the data as it is applied to another computer sub-system. The error perpetuation circuitry perpetuates the error according to a second error identification technique, such as a parity bit error technique. The original data error is thereby perpetuated by converting it to the error identification format used by the computer sub-system to which the data is transferred. Consequently, the original data error is readily identified when an attempt is made to use the data. By perpetuating the data error instead of processing it when it arises, error handling delays can be avoided if the faulty data is never used. This feature improves system performance. In addition, since data errors do not have to be processed when they arise, the design complexity of the system can be reduced.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 2:
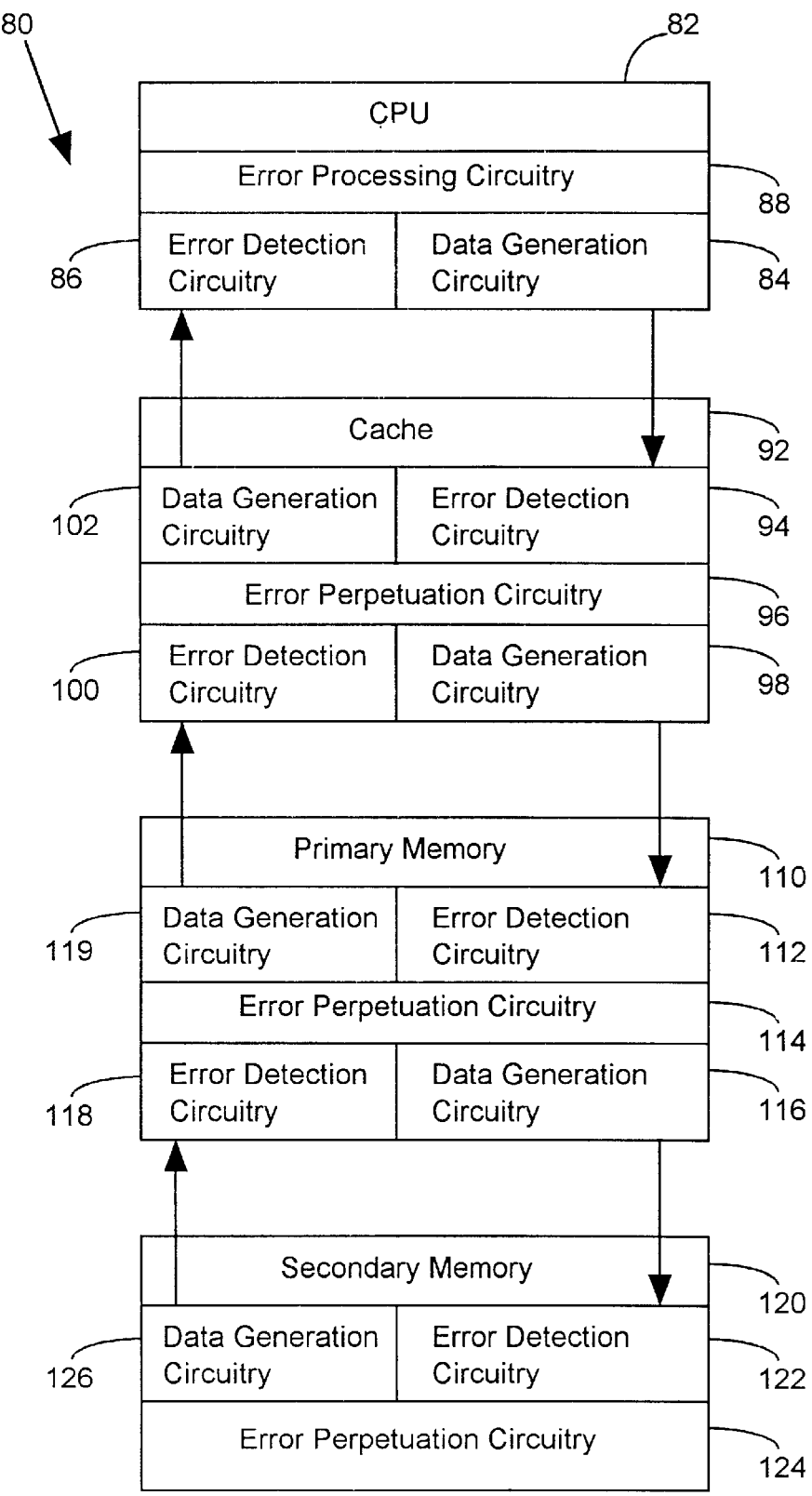
FIG. 2 illustrates an apparatus for processing data transfer errors in a computer, in accordance with one embodiment of the invention.

FIG. 2 illustrates a computer 80 in accordance with the invention. The computer 80 includes a CPU 82 with data generation circuitry 84. The data generation circuitry 84 generally refers to any circuitry in the CPU 82 that is used to generate output signals. The CPU 82 also includes error detection circuitry 86. The error detection circuitry 86 uses a predetermined error identification technique to identify a data error arriving at the CPU 82. The error processing circuitry 88 responds to any data errors identified with the error detection circuitry 86 by preventing the CPU from using the faulty data.

It should be noted that in accordance with the invention, the error detection circuitry 86 may identify faulty data, but if the CPU 82 does not attempt to use the data, then no action is taken. Thus, in contrast to the prior art, with the present invention, data error processing time is not wasted for faulty data that is not actually used. In other words, if a block of data is moved to the CPU 82, and the error detection circuitry 86 identifies faulty data in one byte of the block of data, the error processing circuitry 88 will only be invoked if the one byte of faulty data is required by the CPU 82. In many cases, the single byte of faulty data will not be used by the CPU 82, thus, with the present invention, the CPU does not spend time handling the faulty data.

Figure 1:
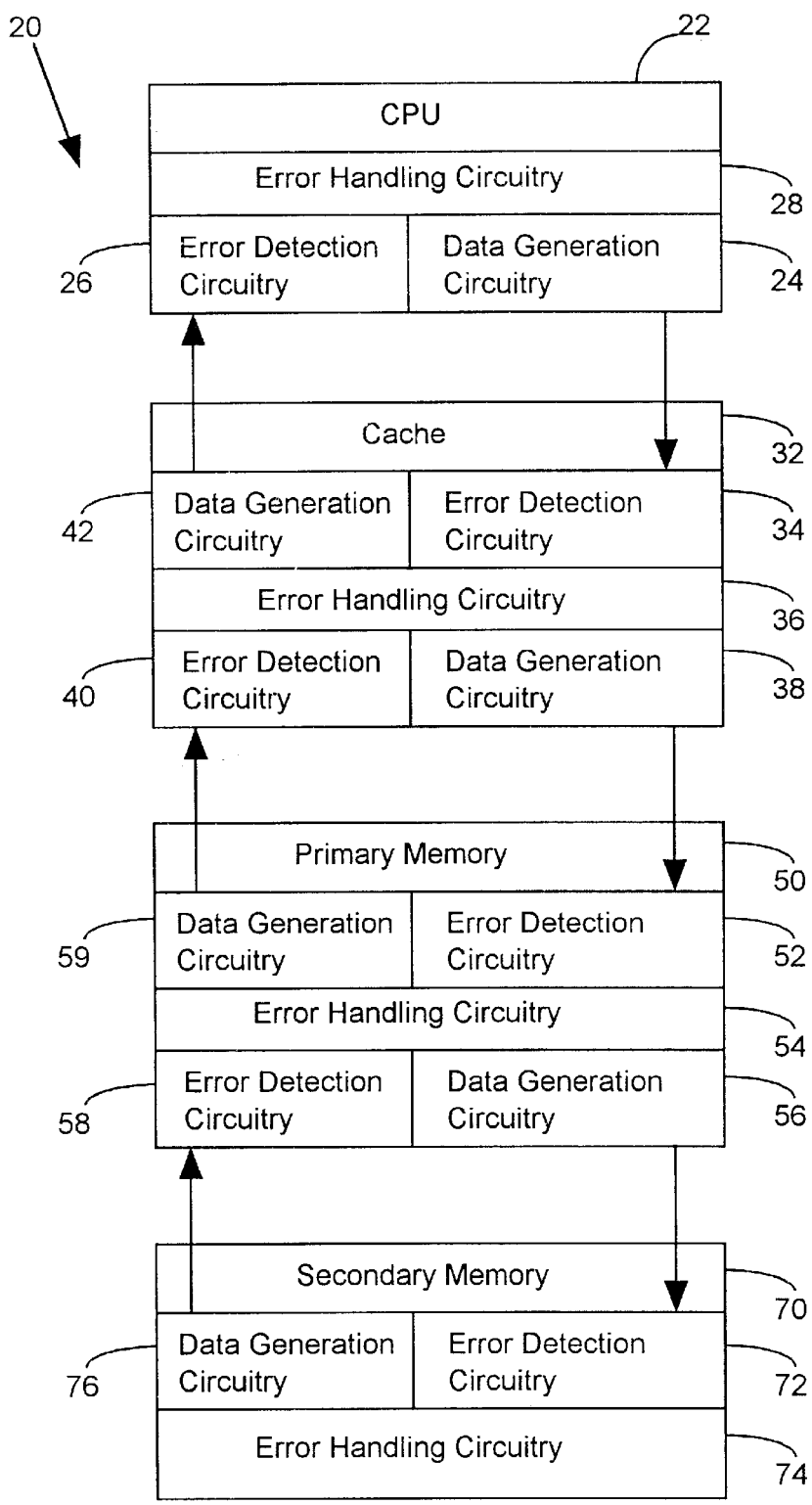
FIG. 1 illustrates an interrupt-based instantaneous error-handling computer system of the prior art.

Another important feature of the invention is that unlike the error handling circuitry 28 of the prior art device of FIG. 1, the error processing circuitry 88 does not respond to interrupts caused by other computer sub-system components. Thus, the error processing circuitry 88 of the invention reduces system complexity. As indicated above, the error processing circuitry 88 of the invention only processes a data error if the CPU 82 actually attempts to use the faulty data. As will be described below, data errors identified in the computer sub-systems (e.g., cache 92, primary memory 110, and secondary memory 120) are handled by propagating the errors to the CPU 82, instead of immediately interrupting the CPU 82 when the error is identified.

FIG. 2 illustrates a cache 92. The cache 92 includes error detection circuitry 94, which receives data from the CPU 82, and error detection circuitry 100, which receives data from the primary memory 110. The error detection circuitry 94, 100 uses a predetermined error identification technique. For example, the error identification technique may be a parity bit error technique.

The cache 92 also includes error perpetuation circuitry 96. The error perpetuation circuitry 96 operates to perpetuate the error identified by the error detection circuitry 94, 100. The error perpetuation circuitry 96 perpetuates the error in such a manner that the error will be recognized by another computer sub-system that uses a different error identification technique. For example, if the data from the cache 92 was being moved to the CPU 82, and the CPU 82 was using error detection circuitry 86 that identifies error correction code, then the error perpetuation circuitry 96 would note the parity bit error identified by the error detection circuitry 94, and in response to it, would generate an error correction code signal indicating a data error. That is, in this example, the cache 92 uses the error detection circuitry 94, 100 to identify a parity bit error and generates an error correction code error through its error perpetuation circuitry 96. The error correction code error is then passed to the primary memory 110 via the data generation circuitry 98, or to the CPU 82 via the data generation circuitry 102.

The error detection circuitry 94, 100 of the cache 92 may be implemented using any type of error identification technique. Similarly, the error perpetuation circuitry 96 may be implemented to perpetuate an error consistent with any error identification technique used by another sub-system (e.g., CPU 82, primary memory 110, secondary memory 120) to which the data is transferred. For instance, to create a parity bit error, the error perpetuation circuitry 96 merely needs to invert the derived parity bit value. In the case of an error correction code, the error perpetuation circuitry 96 sets the additional bits of the error correction code to indicate an error.

FIG. 2 also illustrates a primary memory 110. The primary memory 110 includes error detection circuitry 112. The error detection circuitry 112, 118 is implemented for a predetermined error identification technique, such as a parity bit error technique or an error correction code technique. The primary memory 110 also includes data generation circuitry 116, 119. The data generation circuitry 116, 119 generally refers to any primary memory circuitry used to pass output signals to the secondary memory 120 or the cache 92.

Finally, the primary memory 110 includes error perpetuation circuitry 114. The error perpetuation circuitry 114 responds to the error detection circuitry 112, 118 by generating a perpetuated error signal that will be identified by the sub-system to which the data is being transferred. For example, relying upon the previous example where the error detection circuitry 94, 100 of the cache 92 identifies a parity bit error, the error perpetuation circuitry 96 would create an error correction code error for data leaving the cache 92. Thus, the primary memory 110 has error detection circuitry 112, 118 to identify error correction code errors. The error perpetuation circuitry 114 of the primary memory 110 converts the error correction code error into a parity bit error. Thus, the data generation circuitry 116, 119 passes data with a parity bit error.

FIG. 2 also illustrates a secondary memory 120. The secondary memory 120 includes error detection circuitry 122 implemented for a predetermined error identification technique, such as a parity bit error technique or an error correction code technique. The secondary memory 120 also includes data generation circuitry 126. The data generation circuitry 126 generally refers to any secondary memory circuitry used to generate output signals. Finally, the secondary memory 120 includes error perpetuation circuitry 124. The error perpetuation circuitry 124 responds to the error detection circuitry 122 by generating a perpetuated error signal that will be identified by the sub-system to which the data is being transferred. Again relying upon the previous example, if data was to be transferred from the secondary memory 120 to the primary memory 110, then the error perpetuation circuitry 124 would produce an error correction code error, because that is the type of error recognized by the error detection circuitry 118 of the primary memory 110.

Thus, a primary concept of the invention is to identify a data error with one error identification technique, and then propagate the same error with a second error identification technique, so that the original error can be recognized by a sub-system using a different error identification technique. The error is propagated in this manner without causing a CPU interrupt. If the data error is ultimately passed to the CPU 82 and the CPU 82 actually attempts to use the faulty data, then the error processing circuitry 88 will prevent the CPU 82 from using the data.

Those skilled in the art will recognize a number of advantages associated with the present invention. First, the invention eliminates the computational overhead associated with the instantaneous handling of data errors. Thus, the system of the invention can enjoy performance benefits when faulty data is identified, but not actually used by a CPU. In addition, by eliminating the instantaneous handling of data errors, the complexity of the system may be substantially reduced.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A method of transferring data within a computer, said method comprising the steps of:

detecting at a second computer sub-system an original error in data received from a first computer sub-system that uses a first error identification technique; and producing at said second computer sub-system a first perpetuated error in said data in accordance with a second error identification technique.

2. The method of claim 1 further comprising the step of identifying at a third computer sub-system said first perpetuated error in said data.

3. The method of claim 2 further comprising the step of generating at said third computer sub-system a second perpetuated error in said data.

4. The method of claim 3 wherein said generating step includes the step of generating at said third computer sub-system a second perpetuated error in said data in accordance with said first error identification technique.

5. The method of claim 4 further comprising the step of recognizing at a fourth computer sub-system said second perpetuated error in said data.

6. The method of claim 5 further comprising the step of creating at said fourth computer sub-system a third perpetuated error in said data.

7. The method of claim 6 wherein said creating step includes the step of creating at said fourth computer sub-system a third perpetuated error in said data in accordance with said second error identification technique.

8. The method of claim 1 wherein said first error identification technique is a parity bit error technique.

9. The method of claim 1 wherein said second error identification technique is an error correction code technique.

10. An apparatus for transferring data within a computer, comprising:

a first computer sub-system to produce data; and a second computer sub-system connected to said first computer sub-system, said second computer sub-system including:

error detection circuitry to identify an original error in said data, and error perpetuation circuitry to perpetuate an error in said data.

11. The apparatus of claim 10 wherein said first computer sub-system uses a first error identification technique.

12. The apparatus of claim 11 wherein said second computer sub-system uses a second error identification technique.

13. The apparatus of claim 12 further comprising a third computer sub-system connected to said second computer sub-system, said third computer sub-system including:

error detection circuitry to identify a perpetuated error in said data, and error perpetuation circuitry to perpetuate an error in said data.

14. The apparatus of claim 13 wherein said third computer sub-system uses said first error identification technique.

15. The apparatus of claim 14 wherein said first computer sub-system, said second computer sub-system, and said third computer sub-system are each selected from the group including: a cache, a data buffer, a primary memory, and a secondary memory.

16. The apparatus of claim 12 wherein said first error identification technique and said second error identification technique are each selected from the group including: a parity bit error technique and an error correction code technique.

17. A method of constructing an apparatus for transferring data within a computer, said method comprising the steps of:

providing a first computer sub-system to produce data; and providing a second computer sub-system connected to said first computer sub-system, said second computer sub-system including:

error detection circuitry to identify an original error in said data, and error perpetuation circuitry to perpetuate an error in said data.

18. The method of claim 17 further comprising the step of providing said first computer sub-system with a first error identification technique.

19. The method of claim 18 further comprising the step of providing said second computer sub-system with a second error identification technique.

20. The method of claim 19 further comprising the steps of providing a third computer sub-system connected to said second computer sub-system, said third computer sub-system including:

error detection circuitry to identify a perpetuated error in said data, and error perpetuation circuitry to perpetuate an error in said data in accordance with said first error identification technique.

* * * * *